May 15, 1945.  C. F. BROWN  2,376,118
GAUGE MOUNTING
Filed May 21, 1943

INVENTOR
Charles F. Brown
BY Rowland V. Patrick
ATTORNEY

Patented May 15, 1945

2,376,118

UNITED STATES PATENT OFFICE 2,376,118

GAUGE MOUNTING

Charles F. Brown, Sharon, Mass., assignor to New England Carbide Tool Company, Cambridge, Mass., a corporation of Massachusetts Application May 21, 1943, Serial No. 487,861

6 Claims. (Cl. 33—125)

This invention relates to gauge points and is concerned particularly with an improved mounting for industrial diamonds or other hard materials, such as sapphires or boron carbide, for example, having convex working faces of the type which are commonly used in such gauges. Wherever "diamond" is hereinafter mentioned, it is intended that this will include similar other hard materials with abrasive-resistant qualities.

An essential object of the invention is the provision of a simple brazed mount having a perfectly smooth continuous working face including the surface of the hard material, and which will have no brazing material exposed thereon. Major advantages result. First, the brazing material, which is a relatively soft metal, is never subjected in use of the gauge to the friction wear to which the working face is subjected. Secondly, the working face of the gauge may, after final mounting, be polished without danger of abrasive particles becoming lodged in any relatively soft brazing material where they might subsequently mar material being gauged.

Figure 1:
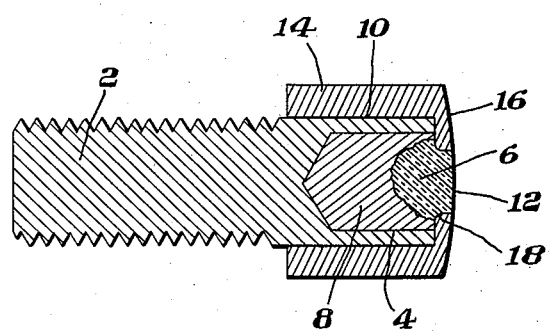
Figure 2:
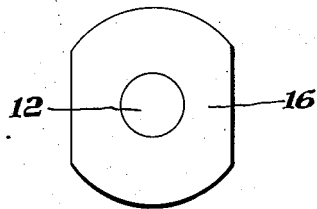

The mounting of this invention is illustrated in the accompanying drawing embodying the holding of an industrial diamond, but I do not wish to confine the invention to this material, as the method may equally well be adapted to holding other hard materials. The drawing is enlarged roughly eight times, and in which Fig. 1 is a cross-sectional view of the improved mounting; and Fig. 2 is a working face elevation thereof.

The tool comprises a threaded shank 2, having a recess 4 and having in its recess a relatively high temperature brazing material 8 brazed to the wall of the recess and a diamond 6 imbedded in the brazing material and brazed thereto. As shown, the diamond 6 projects outwardly from the shank, and is provided with the usual, slightly convex working face 12. Preferably also the diamond has surrounding its working face 12 a circular shoulder or rabbet 18.

Surrounding the shank 2 is an annular metallic member 14 of steel or Monel metal, or other metal having spinning properties, which is fastened to the shank as by brazing with a relatively low temperature brazing material. A projecting portion 16 of the metallic member 14 extends over the end of shank 2 and its edge is spun into overlapping tight annular engagement with the diamond 6 to form a continuously smooth convex working surface as shown, the portion 16 meeting the central diamond surface in a regular, flowing or fair curve, and without intervening crevices. In the form shown, the edge of portion 16 is snugly seated against the shoulder 18 in perfect contact with the diamond 6. The metallic member 14 may be initially applied as an apertured cap, the edges of the aperture being spun into tight engagement with the diamond. With such assembly, the spun over portion 16 of the metallic member 14 seals the brazing material 8 from exposure, and the working face, comprising the central diamond surface 12 and surrounding spun over portion 16, may be properly polished to a predetermined tolerance without any danger of loose particles becoming lodged in the high temperature brazing material 8. The entire working face of the tool is composed of diamond and metal, with the result that the juncture between these surfaces withstands friction wear attendant to the sliding of materials to be tested against the working face. There is less danger, therefore, of any portion of the sharp circular edge of the diamond becoming exposed by reason of wear either during polishing or in use than when a construction is used wherein brazing material or other soft material is exposed on the working face surrounding the diamond surface, as has been common heretofore. Also, the juncture between metal and diamond surfaces is so tight and even that no particles can become caught therein, either during the polishing operation or thereafter.

In the form shown, the working face is formed with a uniform curvature. This particular type of surface has been shown as illustrative only, as the construction is advantageous in any assembly wherein it is desired to form a continuously smooth working surface, and other surface forms may be used.

I claim:

1. A gauge point comprising a shank and abrasion resisting tip associated with said shank and having a smooth face projecting therefrom, brazing material fastening said abrasion resisting tip to said shank and a metallic cap member surrounding and fastened to said shank and having an end flange portion thereof extending inwardly over the end of said shank with the edge thereof in spun engagement with said abrasion resisting tip and concealing said brazing material, the extended portion of said metallic cap member and said abrasion resisting tip forming a continuously smooth working face for said point.

2. A diamond gauge point comprising a shank, a diamond associated with said shank and having a convex end projecting therefrom, brazing material fastening said diamond to said shank, and a metallic cap surrounding and fastened to said shank and having an end flange portion thereof extending inwardly over the end of said shank with the edge thereof in spun engagement with said diamond and concealing said brazing material, the extended portion of said metallic cap and said diamond forming a continuously smooth convex working face for said point.

3. A diamond gauge point comprising a recessed shank, a diamond set in the recess of said shank and having a convex end projecting therefrom, brazing material holding said diamond in said recess, and a metallic cap member surrounding and fastened to said shank and having an end portion thereof extending over the end of said shank with the edge thereof in spun overlapping engagement with said diamond and concealing said brazing material, the extended portion of said metallic member and said diamond forming a continuously smooth convex working face for said point composed of a central diamond surface surrounded by a metallic surface constituting a continuous extension of said diamond surface.

4. A diamond gauge point having a convex working face comprising a recessed shank, a diamond set in said recess and having a convex surface projecting therefrom, brazing material holding said diamond in said recess, and a metallic cap surrounding and fastened to said shank and having the end portion thereof extending over the end of said shank with the edge thereof in spun overlapping engagement with said diamond and concealing said brazing material, the extended portions of said cap and of said diamond forming a continuous smooth polished convex working face for said point.

5. A gauge having an end portion presenting a substantially spherical surface to the work and including a diamond and circumscribing metal engaging and making a tight joint with said diamond, said spherical surface of the gauge being composed solely of the face of said diamond and the face of said circumscribing metal.

6. A gauge comprising a shank having a recess at one end, brazing material brazed in said recess, a diamond set into said brazing material and having a convex outer face portion and a circular rabbet circumscribing said face portion and a cap on said shank composed of spinnable metal and having an inwardly projecting annular flange portion the inner circumference of which is set in tight spun engagement in said rabbet, the outer face of said flange portion being convex and forming with the convex face of said diamond a smooth continuous convex surface.

CHARLES F. BROWN.